US009261097B2

(12) United States Patent
Moricca et al.

(10) Patent No.: US 9,261,097 B2
(45) Date of Patent: Feb. 16, 2016

(54) MONITORING, DIAGNOSING AND OPTIMIZING ELECTRIC SUBMERSIBLE PUMP OPERATIONS

(75) Inventors: Giuseppe Moricca, Codogno (IT);
Maiquel Querales, Katy, TX (US);
Joydeep Dhar, Houston, TX (US);
Gustavo Carvajal, Katy, TX (US);
Alvin S. Cullick, Thornton, CO (US);
Rama K. Vellanki, Houston, TX (US);
Miguel Villamizar, Houston, TX (US);
Jose Rodriguez, Katy, TX (US)

(73) Assignee: LANDMARK GRAPHICS CORPORATION, Houston, TX (US)

( * ) Notice: Subject to any disclaimer, the term of this patent is extended or adjusted under 35 U.S.C. 154(b) by 688 days.

(21) Appl. No.: 13/609,163

(22) Filed: Sep. 10, 2012

(65) Prior Publication Data
US 2014/0039836 A1    Feb. 6, 2014

Related U.S. Application Data

(60) Provisional application No. 61/678,042, filed on Jul. 31, 2012.

(51) Int. Cl.
*G06F 11/30*       (2006.01)
*F04D 15/00*      (2006.01)
(Continued)

(52) U.S. Cl.
CPC ............... *F04D 15/00* (2013.01); *F04D 13/10* (2013.01); *G05B 13/042* (2013.01)

(58) Field of Classification Search
None
See application file for complete search history.

(56) References Cited

U.S. PATENT DOCUMENTS 5,748,500 A * 5/1998 Quentin et al. ............... 702/182
6,229,308 B1   5/2001 Freedman
(Continued)

FOREIGN PATENT DOCUMENTS

WO   WO2009107000   *   9/2009
WO   WO2011163521   *  12/2011
(Continued)

OTHER PUBLICATIONS

"The Role and development of the Operational Asset Optimization Model Within DecisionSpace for Production Solutions", Landmark. 2007. http://www.halliburton.com/public/landmark/contents/papers_and_articles/web/h05631.pdf, (2007),15 pgs.
"XPVision: Monitor Well Conditions and Optimize Production", 2010 Web Article http://c14503045.r45.cf2.rackcdn.com/v1/552237dfd7aa381944e2e4d9884e0904/28388.XPVision_Overview.0412.pdf, (2010), 2 pgs.
(Continued)

*Primary Examiner* — Aditya Bhat
(74) *Attorney, Agent, or Firm* — Krueger Iselin LLP; John W. Wustenberg (57) ABSTRACT

The present disclosure describes systems and methods for monitoring, diagnosing and optimizing operation of an electric submersible pump (ESP). At least some illustrative embodiments include a method that includes collecting measured data representative of a state of an ESP within a well or of well conditions and storing the measured data, matching a nodal analysis model of the well to the well by matching one or more modeled values to corresponding measured data, and identifying one or more likely conditions of the ESP based at least in part on data generated by a matched model. The method further includes updating the matched model to reflect a selected correction of one of the likely conditions identified, generating ESP performance curves using the updated model, and presenting to a user an action recommended to achieve an ESP performance consistent with an ESP operating point selected from one of the ESP performance curves.

31 Claims, 5 Drawing Sheets

(51) Int. Cl.
  *G05B 13/04* (2006.01)
  *F04D 13/10* (2006.01)

(56) References Cited

U.S. PATENT DOCUMENTS

| | | | |
|---|---|---|---|
| 6,236,894 B1 | 5/2001 | Stoisits et al. | |
| 2007/0252717 A1* | 11/2007 | Fielder | 340/648 |
| 2007/0272442 A1 | 11/2007 | Pastusek et al. | |
| 2008/0270328 A1* | 10/2008 | Lafferty et al. | 706/12 |
| 2010/0042458 A1 | 2/2010 | Rashid et al. | |
| 2010/0082275 A1* | 4/2010 | Borsting et al. | 702/56 |
| 2010/0082388 A1 | 4/2010 | Dixit et al. | |
| 2010/0211423 A1* | 8/2010 | Hehmeyer | 705/7 |
| 2011/0022433 A1 | 1/2011 | Nielsen et al. | |
| 2011/0088484 A1* | 4/2011 | Camilleri | 73/861.42 |
| 2011/0186353 A1 | 8/2011 | Turner et al. | |
| 2012/0095603 A1 | 4/2012 | Rashid et al. | |
| 2014/0039793 A1 | 2/2014 | Querales et al. | |

FOREIGN PATENT DOCUMENTS

| | | |
|---|---|---|
| WO | 2014/022318 | 2/2014 |
| WO | 2014/022320 | 2/2014 |

OTHER PUBLICATIONS

Al-Jasmi, Ahmad et al., Abstract, "ESP Smartflow that Integrates Quality andControl Data for Diagnostics and Optimization in Real Time", 2013 SPE Digital Energy, Mar. 5, 2013.The Woodlands, TX., (Jul. 24, 2012),1 pg.

US Non-Final Office Action, dated May 19, 2015, U.S. Appl. No. 13/711,815, "Monitoring, Diagnosing and Optimizing Gas Lift Operations," filed Dec. 12, 2012, 21 pgs.

PCT International Preliminary Report on Patentablility, dated Oct. 21, 2014, Appl No. PCT/US2013/52595, "Monitoring, Diagnosing and Optimizing Gas Lift Operations," filed Jul. 29, 2013, 31 pgs.

PCT International Preliminary Report on Patentablility, dated Sep. 18, 2014, Appl No. PCT/2013/052591, "Electric Submersible Pump Operations," filed Jul. 29, 2013, 14 pgs.

PCT International Search Report and Written Opinion, dated Dec. 16, 2013, Appl No. PCT/US/13/52591, "Monitoring, diagnosing and optimizing electric submersible pump operations," filed Jul. 29, 2013, 17 pgs.

PCT International Search Report and Written Opinion, dated Feb. 7, 2014, Appl No. PCT/US2013/52595, "Monitoring, Diagnosing and Optimizing Gas Lift Operations," filed Jul. 29, 2013, 19 pgs.

\* cited by examiner

MONITORING, DIAGNOSING AND OPTIMIZING ELECTRIC SUBMERSIBLE PUMP OPERATIONS

CROSS-REFERENCE TO RELATED APPLICATIONS

This application claims priority to Provisional U.S. Application Ser. No. 61/678,042, titled "Monitoring, Diagnosing and Optimizing Electric Submergible Pump Operations" and filed Jul. 31, 2012 by G. Moricca, M. M. Querales, J. Dhar, G. Carvajal, A. S. Cullick, R. K. Vellanki, M. Villamizar and J. Rodriguez, which is hereby incorporated herein by reference.

BACKGROUND

Oil field operators dedicate significant resources to improve the recovery of hydrocarbons from reservoirs while reducing recovery costs. To achieve these goals, reservoir engineers both monitor the current state of the reservoir and attempt to predict future behavior given a set of current and/or postulated conditions. Reservoir monitoring, sometimes referred to as reservoir surveillance, involves the regular collection and monitoring of measured production data from within and around the wells of a reservoir. Such data may be collected using sensors embedded behind the well casing and/or from measurement devices introduced into the well within or in line with the production tubing. The data may include, but is not limited to, water saturation, water and oil cuts, fluid pressure and fluid flow rates, and is generally collected at a fixed, regular interval (e.g., once per minute) and monitored in real-time by field personnel. As the data is collected, it is generally archived into a database.

In addition to monitoring conditions within the well, the equipment used to extract product from the well is also monitored. Such monitoring ensures that the equipment is functioning as close to its optimal operating point as possible or practical, and that failures are detected and resolved promptly. One type of equipment used downhole to extract product from oil and gas wells is an electric submersible pump (ESP). ESPs are generally mounted in line with the production tubing where they are submerged within the product present within the well when the tubing is lowered into the well's production casing. ESPs both pump the product to the surface and lower the flowing bottom hole pressure (FBHP). The decrease in FBHP increases the pressure differential between the formation and the well and accelerates the movement of product from the formation into the well through perforations in the casing.

Power to drive an ESP is provided from the surface via cables that also provide conductors for signals to be received from the ESP at the surface. Data transmitted to the surface may include, but is not limited to, motor temperature, motor drive current frequency, pump intake pressure and pump discharge pressure. Although the data provided enables monitoring of the performance of an ESP, determining the underlying cause of a failure or a variation in the performance of an ESP is a more complicated task. A given ESP failure or performance variation can have numerous causes and operators strive to identify the cause of such conditions quickly to reduce any resulting downtime or reduced production. While experienced reservoir personnel may rely on their personal experience to diagnose and resolve such conditions, a more automated approach based on a broader information base offers the possibility of diagnosing conditions and providing more optimal solutions in a shorter period of time.

BRIEF DESCRIPTION OF THE DRAWINGS

A better understanding of the various disclosed embodiments can be obtained when the following detailed description is considered in conjunction with the attached drawings, in which.

It should be understood that the drawings and corresponding detailed description do not limit the disclosure, but on the contrary, they provide the foundation for understanding all modifications, equivalents, and alternatives falling within the scope of the appended claims.

DETAILED DESCRIPTION

The paragraphs that follow describe various illustrative systems and methods for monitoring, diagnosing and optimizing electric submersible pump (ESP) operations. An illustrative production well and related data collection and processing system suitable for collecting and processing measured well and ESP data is first described. A description of a series of user interface displays follows, wherein the displays present data to a user as part of the disclosed ESP monitoring, diagnosing and optimizing. These displays are generated by a data acquisition and processing system that performs software-implemented versions of the disclosed methods. Illustrative methods are described concurrently with an illustrative data acquisition and processing system. Finally, an illustrative ESP task ticketing system is described that supplements the disclosed ESP monitoring, diagnosing and optimizing systems and methods.

Figure 1:
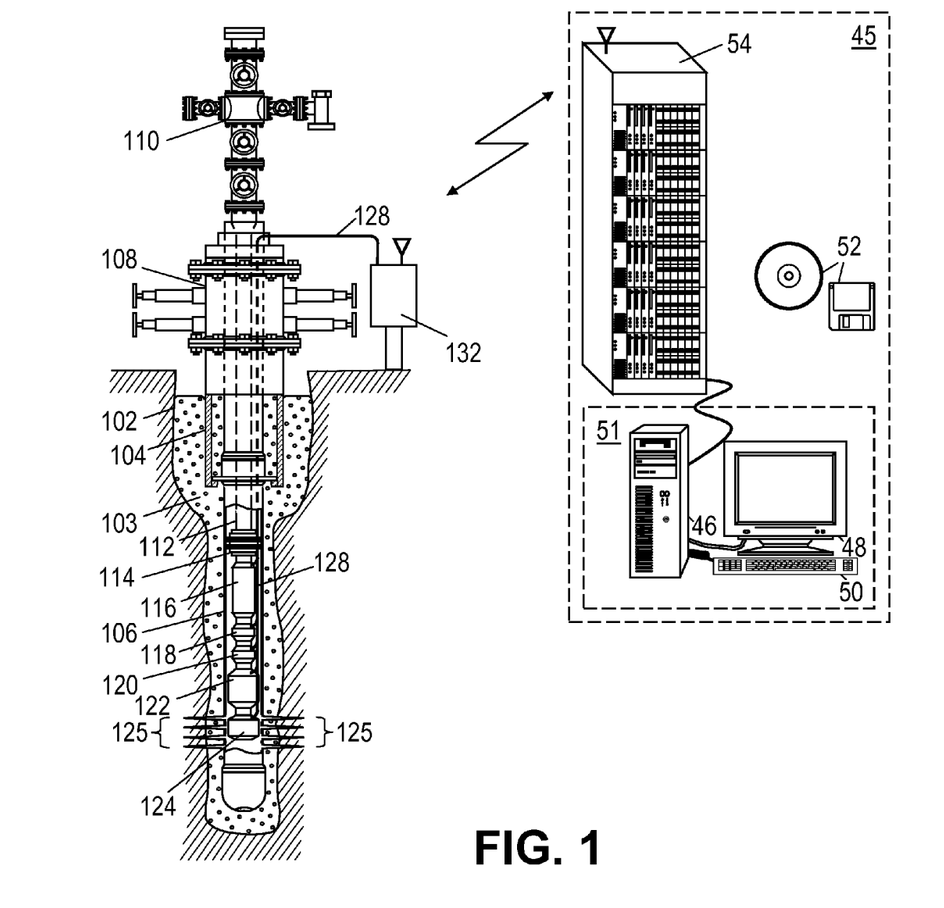
FIG. 1 shows a production well that sources measured well and electric submersible pump (ESP) data.

The systems and methods described herein operate on measured data collected from wells within a reservoir, such as those found in oil and gas production fields. Such fields generally include multiple producer wells that provide access to the reservoir fluids underground. Measured well data is collected regularly from each producer well to track changing conditions in the reservoir. FIG. 1 shows an example of a producer well with a borehole 102 that has been drilled into the earth. Such boreholes are routinely drilled to ten thousand feet or more in depth and can be steered horizontally for perhaps twice that distance. The producer well also includes a casing header 104 and casing 106, both secured into place by cement 103. Blowout preventer (BOP) 108 couples to casing header 106 and production wellhead 110, which together seal in the well head and enable fluids to be extracted from the well in a safe and controlled manner.

The use of measurement devices permanently installed in the well along with the ESP facilitates monitoring and control of an ESP system. The different transducers send signals to the surface that may be stored, evaluated and used to control the ESP system's operations. Measured well data is periodically sampled and collected from the producer well and combined with measurements from other wells within a reservoir, enabling the overall state of the reservoir to be monitored and assessed. These measurements may be taken using a number of different downhole and surface instruments, including but not limited to, temperature and pressure sensor 118 and flow meter 120. Additional devices also coupled in-line to production tubing 112 include downhole choke 116 (used to vary the fluid flow restriction), ESP 122 (which draws in fluid flowing from perforations 125 outside ESP 122 and production tubing 112) ESP motor 124 (driving ESP 122), and packer 114 (isolating the production zone below the packer from the rest of the well). Additional surface measurement devices may be used to measure, for example, the tubing head pressure and the electrical power consumption of ESP motor 124.

Each of the devices along production tubing 112 couples to cable 128, which is attached to the exterior of production tubing 112 and is run to the surface through blowout preventer 108 where it couples to control panel 132. Cable 128 provides power to the devices to which it couples, and further provides signal paths (electrical, optical, etc.,) that enable control signals to be directed from the surface to the downhole devices, and for telemetry signals to be received at the surface from the downhole devices. The devices may be controlled and monitored locally by field personnel using a user interface built into control panel 132, or may be controlled and monitored by a computer system 45. Communication between control panel 132 and computer system 45 may be via a wireless network (e.g., a cellular network), via a cabled network (e.g., a cabled connection to the Internet), or a combination of wireless and cabled networks.

In at least some illustrative embodiments, data is also collected using a production logging tool, which may be lowered by cable into production tubing 112. In other illustrative embodiments, production tubing 112 is first removed, and the production logging tool is then lowered into casing 106. In either case, the tool is subsequently pulled back up while measurements are taken as a function of borehole position and azimuth angle. In other alternative embodiments, an alternative technique that is sometimes used is logging with coil tubing, in which production logging tool couples to the end of coil tubing pulled from a reel and pushed downhole by a tubing injector positioned at the top of production wellhead 110. As before, the tool may be pushed down either production tubing 112 or casing 106 after production tubing 112 has been removed. Regardless of the technique used to introduce and remove it, the production logging tool provides additional data that can be used to supplement data collected from the production tubing and casing measurement devices. The production logging tool data may be communicated to computer system 45 during the logging process, or alternatively may be downloaded from the production logging tool after the tool assembly is retrieved.

Continuing to refer to the example of FIG. 1, control panel 132 includes a remote terminal unit (RTU) which collects the data from the downhole measurement devices and forwards it to a supervisory control and data acquisition (SCADA) system that is part of computer system 45. In the illustrative embodiment shown, computer system 45 includes a set of blade servers 54 with several processor blades, at least some of which provide the above-described SCADA functionality. Other processor blades may be used to implement the disclosed ESP monitoring, diagnosing and optimizing. Computer system 45 also includes user workstation 51, which includes a general processing system 46. Both the processor blades of blade server 54 and general processing system 46 are preferably configured by software, shown in FIG. 1 in the form of removable, non-transitory (i.e., non-volatile) information storage media 52, to process collected well and ESP data. The software may also be downloadable software accessed through a network (e.g., via the Internet). General processing system 46 couples to a display device 48 and a user-input device 50 to enable a human operator to interact with the system software 52. Alternatively, display device 48 and user-input device 50 may couple to a processor blade within blade server 54 that operates as general processing system 46 of user workstation 51.

Figure 2A:
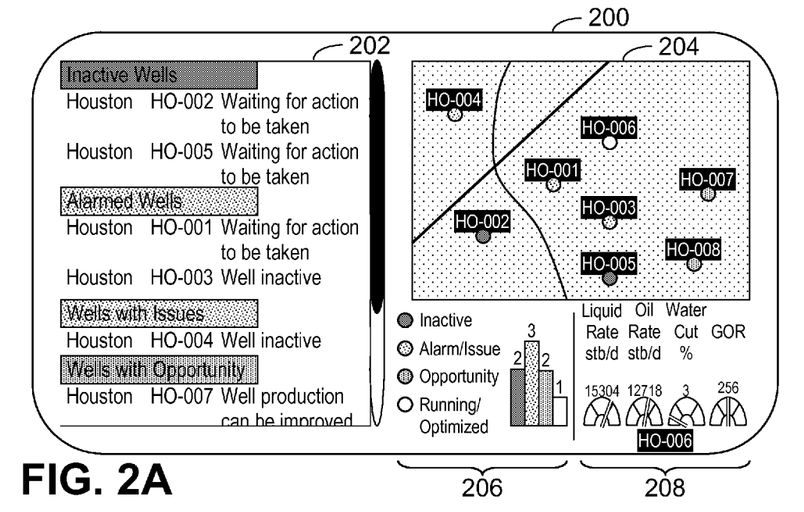
FIGS. 2A-2E show illustrative user interface displays for monitoring, diagnosing and optimizing ESP operations.
Figure 2B:
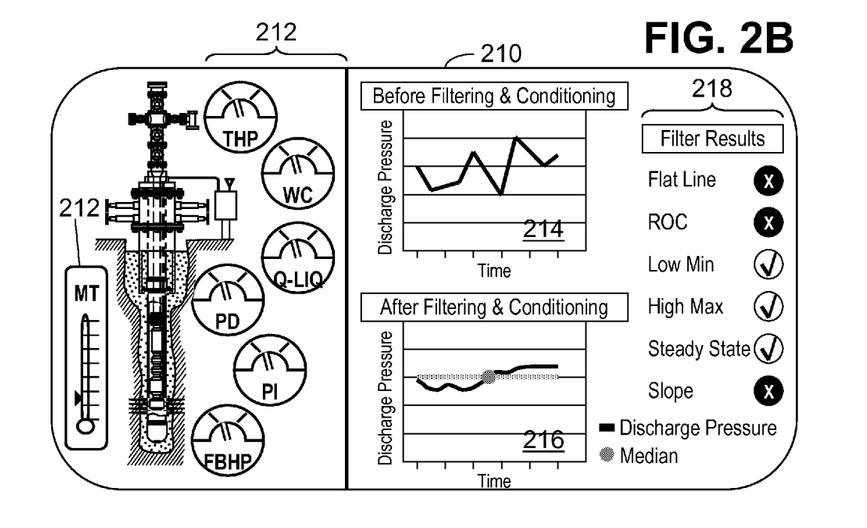
Figure 2C:
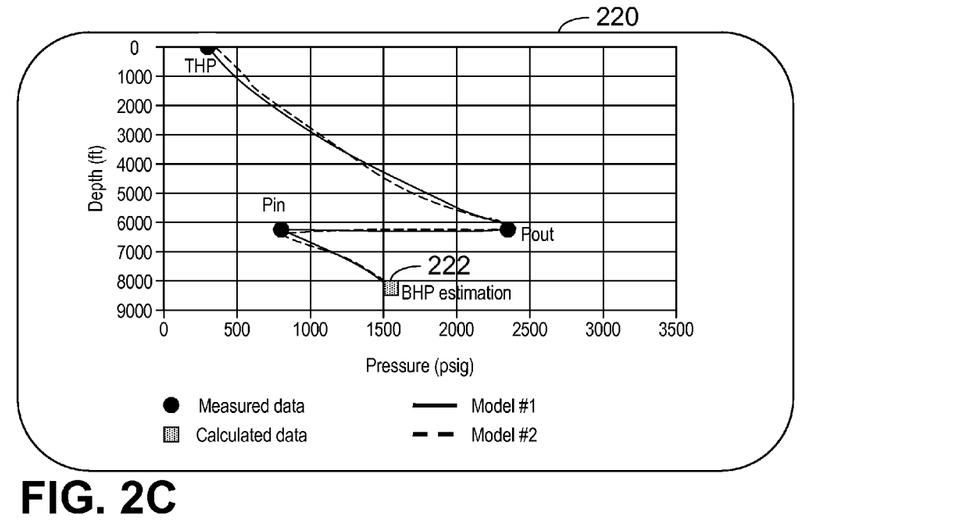

The software executing on the processing blades of blade server 54 and/or on user workstation 51 presents to the user a series of displays, shown as the illustrative displays of FIGS. 2A-2E, that enable the user to determine the state of the well and the ESP and to interact with the software to take action based on the information presented. FIG. 2A shows an illustrative status display 200 for a reservoir (e.g., the "Houston" reservoir) with eight wells of the reservoir displayed on map 204 (wells HO-001 through HO-008). The display includes an advisory section 202 that lists current advisories (sorted by severity and/or type) for wells within the reservoir displayed, a reservoir map 204 that displays the geographic location of the wells within the reservoir and provides a visual status of each well's state (e.g., inactive, in alarm, with opportunities and optimized), a summary 206 of the number of wells in each state, and current real-time values via gauges 208 for a selected well (e.g., HO-006 in FIG. 2A).

The system presents to the user (via summary 202) advisories indicative of the state of a well such as, for example, an inactive well, a well in alarm, a well with a non-critical condition or a well with a performance improvement opportunity. The user can select the well identified by the advisory (or any other well desired) to display a summary 210 of the well's current state, as shown in the illustrative example of FIG. 2B. Well summary 210 enables a user to view measured well and ESP values 212 as the data is collected. These values may include, for example, tubing head pressure (THP), water cuts (WC), liquid flow rates (Q-LIQ), ESP discharge pressure (PD), ESP intake pressure (PI), ESP motor temperature (MT) and flowing bottom hole pressure (FBHP). In at least some illustrative embodiments, the user selects one of the displayed measured values 212, which triggers the display in graphs 214 (unfiltered data) and 216 (filtered data) of the corresponding measured value's data for a time range (e.g., the previous 24 hours). Filtering condition results (Filter Results) 218 are also displayed and indicate whether each of the filtering conditions shown was satisfied (checkmark) or violated ("X") when applied to the data. Each filtering condition operates to filter out noise and/or sampling errors that may be obscuring the signal for the measured value of interest. The unfiltered and filtered signal data, together with the filtering condition results, provide a basis for the stability of the above-described collected values (i.e., THP, WC, etc.) to be assessed and marked as either stable or unstable. In at least some illustrative embodiments, such assessment/marking may be performed automatically by software, while in other embodiments it may be performed manually by the user or through a combination of actions by both a user and software. The stability status of the data may subsequently be presented to the user (e.g., as shown in current conditions section 242 of FIG. 2E). In at least some embodiments, filtered data graph 216 also shows a median value of the data for the selected time period.

In at least some embodiments, a second time range of interest can be selected over which median values are analyzed. For example, the user can request that median values be calculated for each day within a recent 30 day period during which the well equipment was known to be functioning within desired parameters. A nodal analysis model is matched to the median data, with the results of the match shown in the illustrative display 220 of FIG. 2C. In at least some illustrative embodiments, a nodal analysis is applied wherein an analytic equation set represents and models the flow and pressure (nodal analysis model output values) of multi-phase fluids within the borehole. Nodal analysis model input values can include reservoir permeability, reservoir thickness, reservoir porosity, well tubing friction, and completion and perforation characteristics. The nodal analysis of the illustrative embodiment shown consists of selecting a division point or node in the well and dividing the system at this point. The inflow section includes components upstream of the selected node, while the outflow section includes the components downstream of the selected node. The analyzed producing system is modeled as a group of components that includes reservoir rock, completions (e.g., gravel pack, open/closed perforations and open hole), vertical flow strings, restrictions, flow lines and integrated gathering networks through which fluid flows in through the inflow section and out through the outflow section. In at least some illustrative embodiments, the user is provided controls that allow the nodal analysis model parameters to be varied, with the resulting model curve being updated to show the results of the parameter variation. Once the user is satisfied with the model-to-median-data match, the nodal analysis model may be used to estimate values that are not measured directly (e.g., bottom hole pressure estimation 220 of FIG. 2C).

Figure 2D:
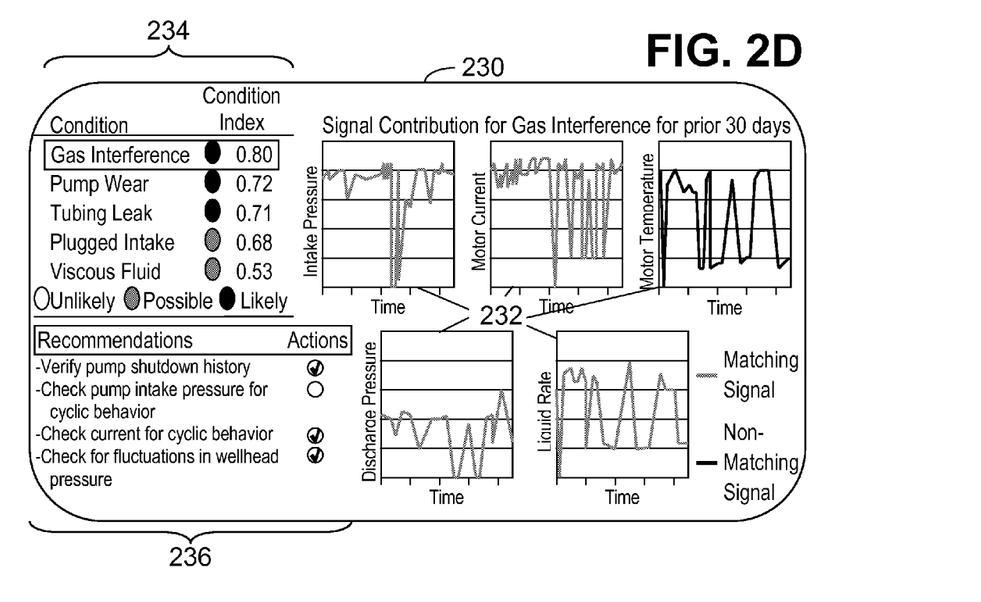
Figure 2E:
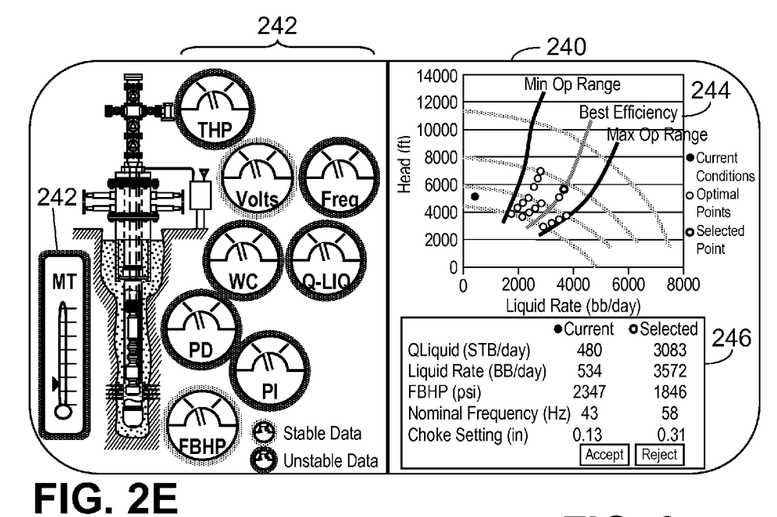

Once matched to one or more datasets from the well, the model can be used to predict the expected behavior of the well. In at least some illustrative embodiments, fuzzy logic (a form of many-valued or probabilistic logic) is applied to the data to perform such predictions. The result is a truth value that varies in value between 0 and 1 (inclusive), representing an approximation between complete "truth" (e.g., a binary "1") and complete falsehood (e.g., a binary "0"). This permits the predicted behavior to be expressed as a probability of said behavior occurring for a given set of conditions. After the model has been matched to existing well datasets, the results of the model may be compared to the actual measured values, with mismatches being identified and flagged. FIG. 2D shows an illustrative display 230, which presents several median measured value graphs 232 for a period of time of interest (e.g. the most recent 24 hours or 30 days of median values). Each graph presents a different median measured value (e.g., ESP intake and discharge pressures), with different line types used to indicate whether the median measured value matches the value predicted by the nodal analysis model (e.g., is within a tolerance range of the predicted value). In at least some illustrative embodiment, the median measured values and their corresponding mismatches with the nodal analysis model are provided as input to an intelligent analysis system to calculate the weighted contribution of matched values to the likely condition (e.g., a rule-based expert system or a fuzzy-logic-based system). The intelligent analysis system identifies one or more likely conditions that might be the cause of the mismatch (i.e., the cause of any abnormal, unexpected and/or undesired behavior of the well and/or ESP). These possible conditions and their estimated probability or "condition index" are presented to the user as ranked condition list 234 of FIG. 2D. The user may select each condition, with the resulting match/mismatch being shown for each graphed median measured value. This is shown in FIG. 2D, where the "gas interference" conditions is selected. In the illustrative embodiment shown, a list of recommendations 236 to correct the selected condition is also presented to the user, from which the user may select one or more recommendations to be applied to the well.

In addition to enabling a user to diagnose conditions as described above, the disclosed methods and system may enable a user to improve the performance of a system. In at least some illustrative embodiments, the user brings up display 240 of FIG. 2E, which presents current conditions 242 of the well and the ESP (including an indication of the stability of the data values, as previously described), together with performance curves 244 generated by the matched nodal analysis model. The graph shows both the current and estimated performance points of the ESP. When the user selects a desired performance point, the resulting estimated values are shown below the graph in table 246, together with the control parameters necessary to achieve the desired ESP performance (e.g., choke setting and ESP motor frequency). When the user is satisfied with the quality of an updated model, that is, how well the model matches the observed data, the user can accept the updated model by clicking the ACCEPT button shown. An accepted model is stored and marked as the current valid model. If the user rejects a model by clicking the REJECT button, that model is not stored and the user can adjust the model further to improve the data match.

Figure 3:
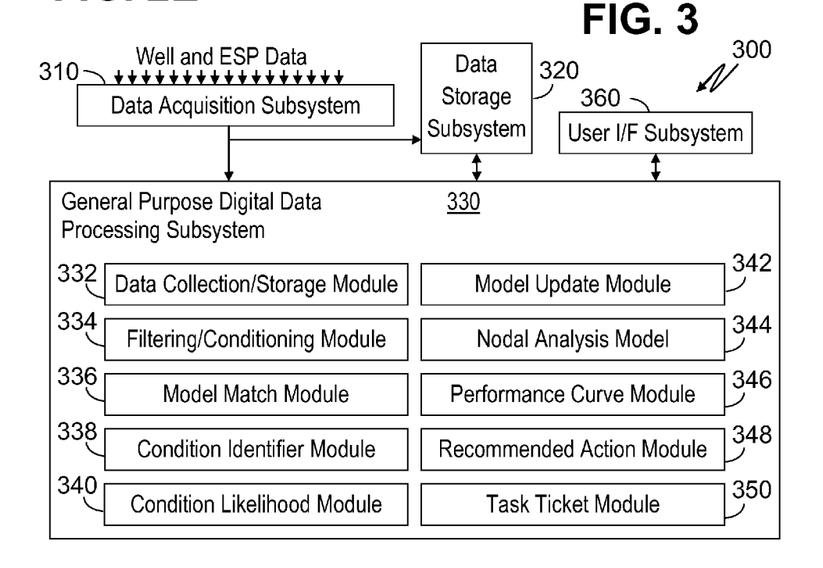
FIG. 3 shows an illustrative data acquisition and processing system suitable for implementing software-based embodiments of the systems and methods described herein.
Figure 4A:
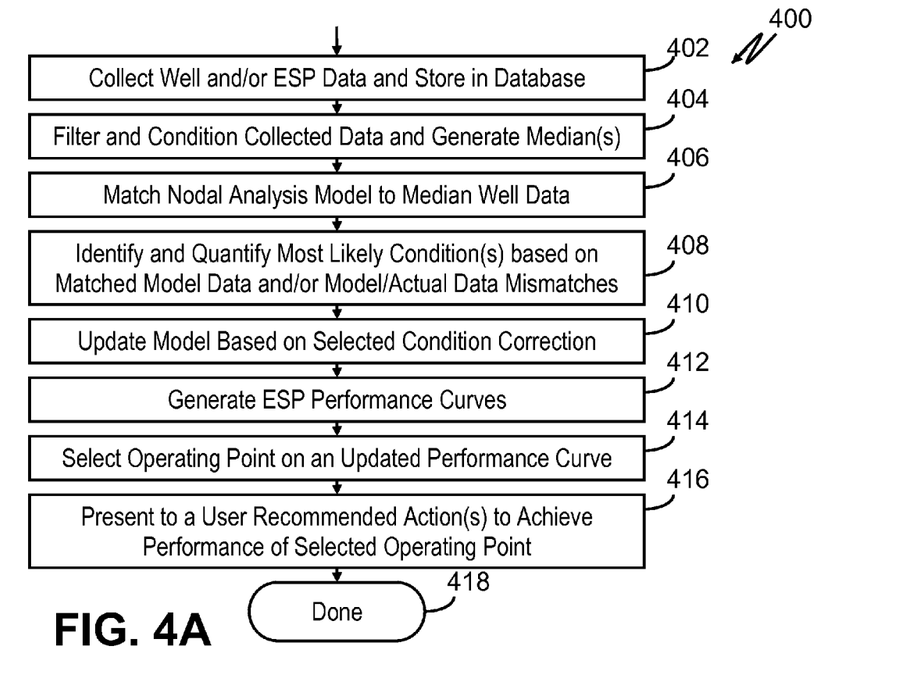
FIG. 4A shows an illustrative ESP monitoring, diagnosing and optimizing method.

A system 300 is shown in FIG. 3 that performs a software-implemented embodiment of the above-described operations according to the illustrative method 400 shown in FIG. 4A. Software modules are shown within the processing subsystem 330 of FIG. 3 that perform the various block of FIG. 4A. More specifically, and referring to both FIGS. 3 and 4A, well and ESP data is collected via data acquisition subsystem 310 and stored by data collection/storage module 332 onto a database within data storage subsystem 320 (block 402). The data (real-time and/or stored) is operated upon by filtering and conditioning module 334 (block 404) according to filtering options selected by the user to produce one or more median values. A nodal analysis model 344 of the well is matched to well median values by model match module 336 (block 406), which also presents data generated by the matched model to the user. The data generated by the matched model is used by condition identifier module 338 and condition likelihood module 340 to identify and present to the user the likely condition(s) causing mismatches between the matched model results and actual sampled well and ESP data, along with numerical estimates of the likelihood of each condition (block 408). Model update module 342 updates nodal analysis model 344 based on the condition correction selected by the user (block 410), and performance curve module 346 generates ESP performance curves based on data generated by the updated nodal analysis model (block 412). Once an operating point on the ESP performance curve is selected (block 414), recommended action module 348 identifies and presents to the user control values and/or other actions (e.g., a choke setting and ESP motor frequency) calculated to produce an ESP performance consistent with the selected operating point (e.g., at or near the operating point within ±a selected tolerance value; block 416), ending method 400 (block 418).

Figure 4B:
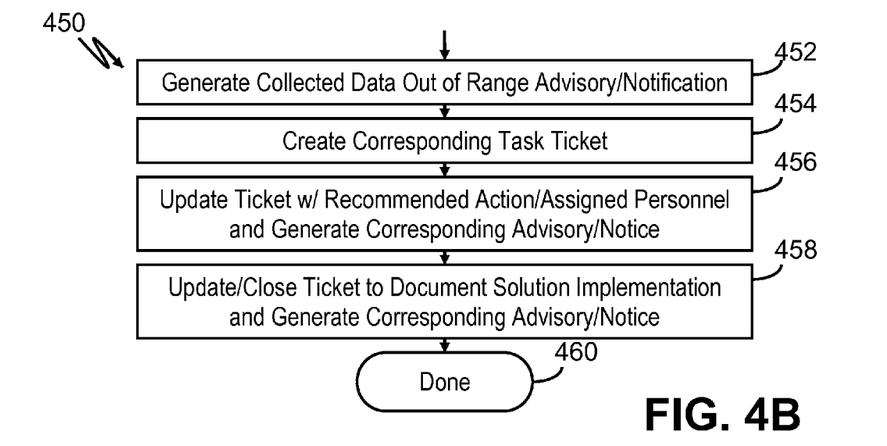
FIG. 4B shows an illustrative ESP operations task ticketing method that works in conjunction with the illustrative ESP monitoring, diagnosing and optimizing method described.

The above-described systems and methods may be augmented by a task ticketing system that notifies reservoir operator personnel of well conditions of interest as they occur, and that allows such conditions to be monitored and tracked as they progress from detection through diagnosis, correction and resolution. Within each phase, an authorization mechanism may be implemented requiring that supervisory personnel authorize field and/or engineering personnel before they are allowed to implement corrective action. FIG.

4B shows an illustrative method that implements such a task ticketing system. When an advisory is generated by the monitoring, diagnosis and optimizing system during data collection (e.g., because a measured value has exceeded a threshold limit or is outside an allowable range of values), a notification is also generated (block 452) and a task ticket is created (block 454). The notification may include, for example, emails, automated text messages and/or pages, which are sent to contacts based on the nature of the underlying condition according to one or more previously configured distribution lists. As the process of diagnosing and correcting an alarm or issue, or improving the performance of a well/ESP progresses, the task ticket is updated to reflect any action taken, including assignment of personnel to address the underlying condition (block 456), any required authorizations, equipment corrections, repairs and/or replacements, and final resolution/disposition of the condition (block 458). The method ends (block 460) after the task ticket is closed (block 458). In at least some illustrative embodiments, additional notifications are generated each time the task ticket is update. In at least some of the task ticket updates may be performed automatically by the monitoring, diagnosing and optimizing system, while others may be manually performed by users of the system. Users may be given access to task tickets, whether only for viewing or for updating, according to an access permission structure similar to that used in a typical computer file system.

Numerous other modifications, equivalents, and alternatives, will become apparent to those skilled in the art once the above disclosure is fully appreciated. For example, although at least some software embodiments have been described as including modules performing specific functions, other embodiments may include software modules that combine the functions of the modules described herein. Also, it is anticipated that as computer system performance increases, it may be possible in the future to implement the above-described software-based embodiments using much smaller hardware, making it possible to perform the described monitoring, diagnosing and optimizing using on-site systems (e.g., systems operated within a well-logging truck located at the reservoir). Additionally, although at least some elements of the embodiments of the present disclosure are described within the context of monitoring real-time data, systems that use previously recorded data (e.g., "data playback" systems) and/or simulated data (e.g., training simulators) are also within the scope of the disclosure. It is intended that the following claims be interpreted to embrace all such modifications, equivalents, and alternatives where applicable.

What is claimed is:

1. A method for monitoring, diagnosing and optimizing operation of an electric submersible pump (ESP) that comprises:
    collecting measured data representative of a state of an ESP within a well or of well conditions, and further storing the measured data;
    matching a nodal analysis model of the well to the well by matching one or more modeled values to corresponding measured data;
    identifying one or more likely conditions of the ESP based at least in part on data generated by a matched nodal analysis model;
    updating the matched nodal analysis model to reflect a selected correction of one of the one or more likely conditions identified;
    generating a plurality of ESP performance curves using the updated matched nodal analysis model; and
    presenting to a user an action recommended to achieve an ESP performance consistent with an ESP operating point selected from one of the plurality of ESP performance curves.

2. The method of claim 1, further comprising filtering and conditioning the measured data, wherein the corresponding measured data used by the matching comprises the filtered and conditioned data.

3. The method of claim 1, further comprising generating a plurality of recommended actions based on at least one of the one or more likely conditions identified, wherein the action recommended is selected from the plurality of recommended actions.

4. The method of claim 3, further comprising generating the one or more likely conditions at least in part by applying fuzzy logic to the measured data.

5. The method of claim 1, wherein the measured data comprises data selected from the group consisting of real-time data, recorded data and simulated data.

6. The method of claim 1, wherein the matching is performed iteratively using different model parameters for each iteration until the one or more modeled values are within a tolerance range of corresponding measured data values.

7. The method of claim 1, wherein the data representative of the well conditions comprises data selected from the group consisting of bottom hole pressure, bottom hole temperature, tube head pressure, tube head temperature, choke size, fluid flow rates, oil flow rates and water cuts.

8. The method of claim 1, wherein the data representative of the state of the ESP comprises data selected from the group consisting of intake pressure, outlet pressure, motor temperature, motor frequency and motor amperage.

9. The method of claim 8, further comprising presenting to at least one of one or more users the current status of the task tracking ticket.

10. The method of claim 8, further comprising determining if at least one of one or more users may view or update the task tracking ticket based upon an access permission structure.

11. The method of claim 1, wherein the identifying of the one or more likely conditions comprises calculating a probability for each of a plurality of conditions, ranking each of the plurality of conditions according to its probability and presenting to the user one or more of the plurality of conditions as a ranked condition list.

12. The method of claim 1, further comprising:
    generating an advisory message if a value of the measured data is detected outside of an allowable range of values and sending out a corresponding notification to one or more contacts of a distribution list;
    creating a task tracking ticket corresponding to the advisory message;
    updating the task tracking ticket to include the action recommended and personnel assigned to implement the solution;
    updating the task tracking ticket to document implementation of the solution and closing the task tracking ticket; and
    generating an additional advisory message and sending out an additional corresponding notification to the one or more contacts each time the task tracking ticket is updated.

13. The method of claim 1, wherein the matched nodal analysis model outputs flow and pressure of multi-phase fluids within the borehole based on a set of inputs including well tubing friction.

14. The method of claim 13, wherein the set of inputs further include reservoir permeability.

15. An electric submersible pump (ESP) monitoring, diagnosing and optimizing system that comprises:
   a memory having ESP monitoring, diagnosing and optimizing software; and
   one or more processors coupled to the memory, the software causing the one or more processors to:
      collect measured data representative of a state of an ESP within a well or of well conditions, and further store the measured data;
      match a nodal analysis model of the well to the well by matching one or more modeled values to corresponding measured data;
      identify one or more likely conditions of the ESP based at least in part on data generated by a matched nodal analysis model;
      update the matched nodal analysis model to reflect a selected correction of one of the one or more likely conditions identified;
      generate a plurality of ESP performance curves using the updated matched nodal analysis model; and
      present to a user an action recommended to achieve an ESP performance consistent with an ESP operating point selected from one of the plurality of ESP performance curves.

16. The system of claim 15, wherein the software further causes the one or more processors to filter and condition the measured data, and wherein the corresponding measured data used to match the nodal analysis model to the well comprises the filtered and conditioned data.

17. The system of claim 15, wherein the software further causes the one or more processors to generate a plurality of recommended actions based on at least one of the one or more likely conditions identified, and wherein the action recommended is selected from the plurality of recommended actions.

18. The system of claim 17, wherein the software further causes the one or more processors to generate the one or more likely conditions at least in part by applying fuzzy logic to the measured data.

19. The system of claim 15, wherein the measured data comprises data selected from the group consisting of real-time data, recorded data and simulated data.

20. The system of claim 15, wherein the software further causes the one or more processors to match the nodal analysis model to the well iteratively using different model parameters for each iteration until the one or more modeled values are within a tolerance range of the corresponding measured data.

21. The system of claim 15, wherein the data representative of the well conditions comprises data selected from the group consisting of bottom hole pressure, bottom hole temperature, tube head pressure, tube head temperature, choke size, fluid flow rates, oil flow rates and water cuts.

22. The system of claim 15, wherein the data representative of the state of the ESP comprises data selected from the group consisting of intake pressure, outlet pressure, motor temperature, motor frequency and motor amperage.

23. The system of claim 15, wherein the software further causes the one or more processors to identify the one or more likely conditions at least in part by causing the processor to calculate a probability for each of a plurality of conditions, rank each condition according to its probability and present to the user one or more of the plurality of conditions as a ranked condition list.

24. A non-transitory information storage medium having electric submersible pump (ESP) monitoring, diagnosing and optimizing software that comprises:
   a data collection and storage module that collects measured data representative of a state of an ESP within a well or of well conditions, and further stores the measured data;
   a model match module that matches a nodal analysis model of the well to the well by matching one or more modeled values to corresponding measured data;
   a condition identifier module that identifies one or more likely conditions of the ESP based at least in part on data generated by a matched nodal analysis model;
   a model update module that updates the matched nodal analysis model to reflect a selected correction of one of the one or more likely conditions identified;
   a performance curve module that generates a plurality of ESP performance curves using the updated matched nodal analysis model and accepts a selection of an ESP operating point on one of the plurality of ESP performance curves; and
   a recommended action module that identifies and presents to a user one or more actions recommended to achieve an ESP performance consistent with the selected ESP operating point.

25. The storage medium of claim 24, wherein the software further comprises a filtering and conditioning module that filters and conditions the measured data, and wherein the corresponding measured data used to match the nodal analysis model to the well comprises the filtered and conditioned data.

26. The storage medium of claim 24, wherein the software further comprises a recommended action module that generates a plurality of recommended actions based on at least one of the one or more likely conditions identified, and wherein the action recommended is selected from the plurality of recommended actions.

27. The storage medium of claim 26, wherein the recommended action module further generates the one or more likely conditions at least in part by applying fuzzy logic to the measured data.

28. The storage medium of claim 24, wherein the measured data comprises data selected from the group consisting of real-time data, recorded data and simulated data.

29. The storage medium of claim 24, wherein the data representative of the well conditions comprises data selected from the group consisting of bottom hole pressure, bottom hole temperature, tube head pressure, tube head temperature, choke size, fluid flow rates, oil flow rates and water cuts.

30. The storage medium of claim 24, wherein the data representative of the state of the ESP comprises data selected from the group consisting of intake pressure, outlet pressure, motor temperature, motor frequency and motor amperage.

31. The storage medium of claim 24, wherein the software further comprises a condition likelihood module that identifies the one or more likely conditions at least in part by calculating a probability for each of a plurality of conditions, ranking each condition according to its probability and presenting to the user one or more of the plurality of conditions as a ranked condition list.

* * * * *